US007084870B2

(12) United States Patent
Fang et al.

(10) Patent No.: US 7,084,870 B2
(45) Date of Patent: Aug. 1, 2006

(54) INTERACTIVE BINAURAL SHELL MODELING FOR HEARING AIDS

(75) Inventors: Tong Fang, Morganville, NJ (US); Jason Jenn-Kwei Tyan, Princeton, NJ (US); Ming Fang, Princeton Jct., NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 400 days.

(21) Appl. No.: 10/739,733

(22) Filed: Dec. 18, 2003

(65) Prior Publication Data

US 2004/0165740 A1 Aug. 26, 2004

Related U.S. Application Data

(60) Provisional application No. 60/434,744, filed on Dec. 19, 2002.

(51) Int. Cl.
*G06T 17/00* (2006.01)
(52) U.S. Cl. .......................................... 345/420; 700/98
(58) Field of Classification Search .................. None
See application file for complete search history.

(56) References Cited

U.S. PATENT DOCUMENTS

2002/0138237 A1 * 9/2002 Topholm ........................ 703/1

2003/0074174 A1 * 4/2003 Fu et al. ......................... 703/13
2003/0164952 A1 * 9/2003 Deichmann et al. ......... 356/603
2004/0107080 A1 * 6/2004 Deichmann et al. ........... 703/6

FOREIGN PATENT DOCUMENTS

| EP | 1246506 | 10/2002 |
|---|---|---|
| WO | WO 02/30157 | 4/2002 |
| WO | WO 02/071794 | 9/2002 |

OTHER PUBLICATIONS

On line Press Release Article "Rapid Shell Modeling software launched for commercial sale" by Materialise, pp. 1-2 http://www.materialise.com/PressReleases/RSM_ENG.html.*

* cited by examiner

*Primary Examiner*—Mark Zimmerman
*Assistant Examiner*—Enrique L. Santiago
(74) *Attorney, Agent, or Firm*—Donald B. Paschburg; F. Chau & Associates, LLP

(57) ABSTRACT

A system and method for modeling binaural shells for hearing aids, wherein the system is configured to load data associated with a first and a second ear shell. The system is further configured to register the data associated with the first and the second ear shells and process the first ear shell. The system is also configured to store data associated with processing the first ear shell and then map the data associated with processing the first ear shell to the second ear shell. Subsequently, the mapped second ear shell is interactively adjusted by an operator to compensate for an inconsistency in the mapped second ear shell.

32 Claims, 11 Drawing Sheets

INTERACTIVE BINAURAL SHELL MODELING FOR HEARING AIDS

CROSS-REFERENCE TO RELATED APPLICATIONS

This application claims the benefit of U.S. Provisional Application No. 60/434,744, filed Dec. 19, 2002.

BACKGROUND OF THE INVENTION

1. Technical Field

The present invention relates to hearing aids and more particularly, to interactively modeling binaural shells for hearing aids.

2. Discussion of the Related Art

In most humans, hearing impairment occurs in both ears rather than a single ear. As a result, most humans require a hearing aid for both ears in order to compensate for their hearing loss. Hearing aids, however, are typically custom made because most humans have different levels of hearing loss and different inner canal, meatus and/or concha structures.

In order to manufacture a hearing aid or pair thereof, a health care professional takes impressions of a patient's left and right ears, which are duplicates of the contours of the patient's ears, and then forwards these impressions to a hearing aid manufacturer. The hearing aid manufacturer then replicates the impressions into, for example, hearing aid shells so they will fit the patient and, then installs electronic hearing components into the shells thus completing the manufacturing process.

In an effort to streamline the above manufacturing process, several computerized methods of manufacture have been developed. These methods commonly referred to as electronic modeling systems include sundry electronic detailing and modeling procedures, which are used to aid in the manufacture of hearing aid shells. These methods, however, typically manufacture each shell separately thus leading to inconsistencies between the shells resulting in increased production time and cost.

SUMMARY OF THE INVENTION

The present invention overcomes the foregoing and other problems encountered in the known teachings by providing a system and method for interactively modeling binaural shells for hearing aids.

In one embodiment of the present invention, a method for modeling binaural shells for hearing aids comprises the steps of loading data associated with a first and a second ear shell, registering the data associated with the first and the second ear shells, processing the first ear shell, storing data associated with the processing of the first ear shell, mapping the data associated with the processing of the first ear shell to the second ear shell, and adjusting the mapped second ear shell.

In another embodiment of the present invention, a system for modeling binaural shells for hearing aids comprises a memory device for storing a program, a processor in communication with the memory device, the processor operative with the program to load data associated with a first and a second ear shell, register the data associated with the first and the second ear shells, process the first ear shell, store data associated with the processing of the first ear shell, map the data associated with the processing of the first ear shell to the second ear shell, and adjust the mapped second ear shell.

In yet another embodiment of the present invention, a computer program product comprising a computer useable medium having computer program logic recorded thereon for modeling binaural shells for hearing aids, the computer program logic comprises program code for loading data associated with a first and a second ear shell, program code for registering the data associated with the first and the second ear shells, program code for processing the first ear shell, program code for storing data associated with the processing of the first ear shell, program code for mapping the data associated with the processing of the first ear shell to the second ear shell, and program code for adjusting the mapped second ear shell.

In another embodiment of the present invention, a system for modeling binaural shells for hearing aids, comprises a means for loading data associated with a first and a second ear shell, a means for registering the data associated with the first and the second ear shells, a means for processing the first ear shell, a means for storing data associated with the processing of the first ear shell, a means for mapping the data associated with the processing of the first ear shell to the second ear shell, and a means for adjusting the mapped second ear shell.

In yet another embodiment of the present invention, a method for modeling binaural shells for hearing aids, comprises loading data associated with a first ear shell, processing the first ear shell, storing data associated with the processing of the first ear shell, loading data associated with a second ear shell, registering the first and second ear shells, mapping the data associated with the processing of the first ear shell to the right ear shell, and interactively adjusting the mapped second ear shell.

In another embodiment of the present invention, a method for modeling binaural shells for hearing aids, comprises loading data associated with a first and a second ear shell that has been obtained by scanning an auditory canal, concha, or meatus of an ear, registering the data associated with the first and the second ear shells to represent the surface of the loaded data as a three-dimensional model, processing the first ear shell by performing a detailing and/or modeling procedure on the first ear shell, storing data associated with the processing of the first ear shell in a database and/or memory, mapping the data associated with the processing of the first ear shell to the second ear shell so that the processing that occurred on the first ear shell is performed on the second ear shell, and interactively adjusting the mapped second ear shell via an input means to compensate for an inconsistency in the mapped second ear shell.

The foregoing advantages and features are of representative embodiments and are presented to assist in understanding the invention. It should be understood that they are not intended to be considered limitations on the invention as defined by the claims, or limitations on equivalents to the claims. Therefore, this summary of features and advantages should not be considered dispositive in determining equivalents. Additional features and advantages of the invention will become apparent in the following description, from the drawings and from the claims.

DETAILED DESCRIPTION OF EXEMPLARY EMBODIMENTS

Figure 1:
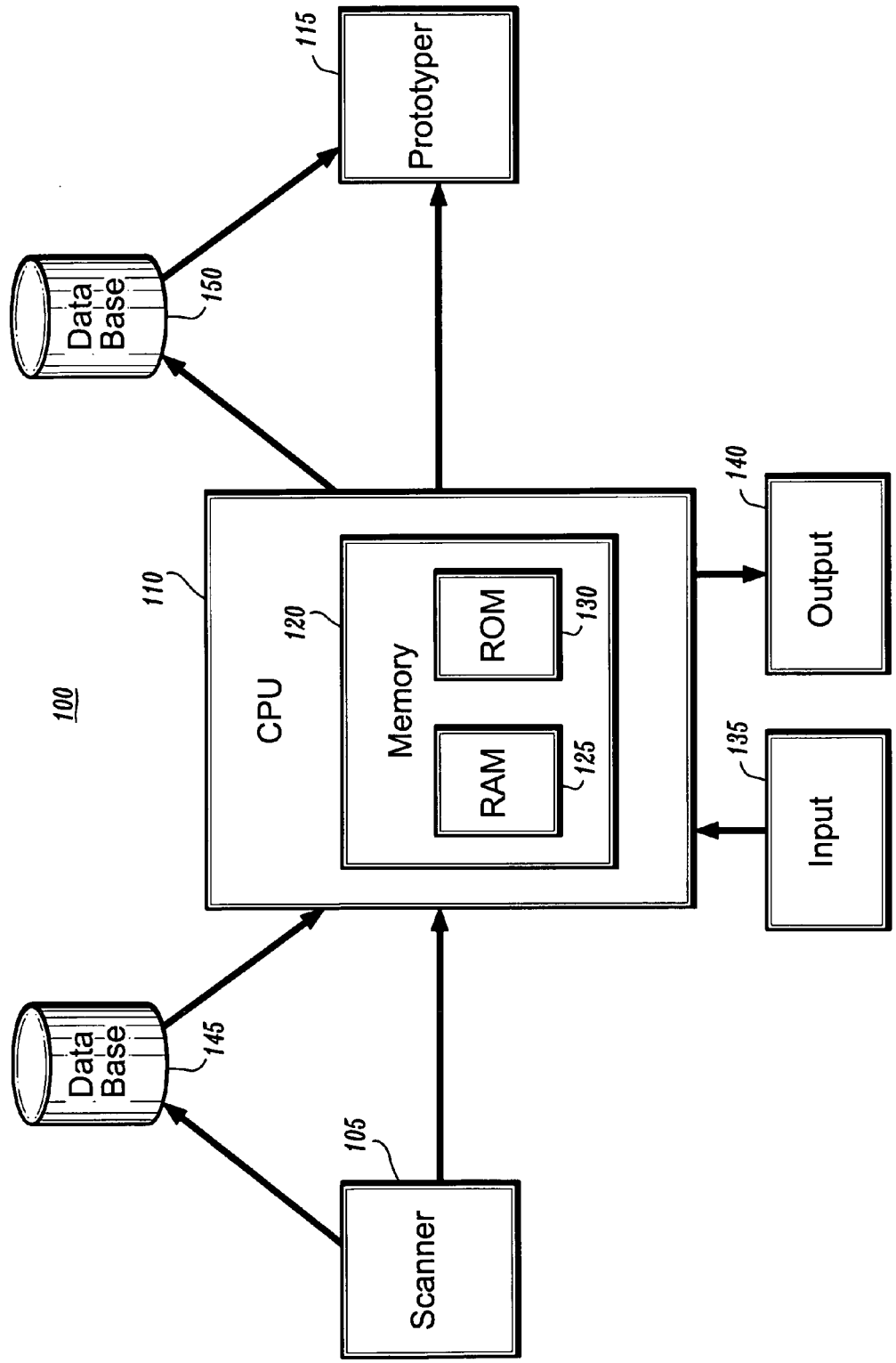
FIG. 1 is a block diagram of an electronic modeling system according to an exemplary embodiment of the present invention.

FIG. 1 is a block diagram of an electronic modeling system 100 according to an exemplary embodiment of the present invention. As shown in FIG. 1, the modeling system 100 includes, inter alia, a three-dimensional (3D) scanner 105, a central processing unit (CPU) 110 and a prototyping machine (i.e., prototyper) 115. The CPU 110 includes a memory 120 and is operatively connected to an input 135 and an output 140.

The memory 120 includes a random access memory (RAM) 125 and a read only memory (ROM) 130. The memory 120 can also include a database, disk drive, tape drive, etc., or a combination thereof. The RAM 125 functions as a data memory that stores data used during the execution of the program in the CPU 110 and is used as a work area. The ROM 130 functions as a program memory for storing a program executed in the CPU 110. The input 135 is constituted by a keyboard, mouse, etc. and the output 140 is constituted by a liquid crystal display (LCD), cathode ray tube (CRT) display, printer, etc.

The scanner 105, which is used to scan an impression of an ear, may communicate directly to the CPU 110 via a wired and/or wireless connection or in-directly via a database 145 or a server. The database 145 may be connected to the scanner 105 or the CPU 110 via a local area network (LAN), wide area network (WAN) or the internet, etc. The scanner 105 may be an optical, ultrasound, magnetic resonance (MR) or computed tomographic (CT) type 3D scanner.

The prototyper 115, which is used to model a hearing aid shell, may communicate directly with the CPU 110 via a wired and/or wireless connection or in-directly via a database 150 or a server. The database 150 may also be connected to the prototyper 115 or the CPU 110 via a LAN, WAN or the internet, etc. The prototyper 115 may produce a physical version of the hearing aid shell using a prototyping/modeling technique such as Milling, stereo lithography, solid ground curing, selective laser sintering, direct shell production casting, 3D-printing, topographic shell fabrication, fused deposition modeling, inkjet modeling, laminated object manufacturing, nano-printing, etc.

An electronic detailing and modeling procedure for interactively modeling binaural shells for hearing aids in accordance with the present invention will now be described. It is to be understood, however, that other electronic detailing and/or modeling procedures may be used in accordance with the present invention to model binaural shells for hearing aids. In addition, the following procedures may be performed in a number of different sequences with satisfying results.

Figure 2:
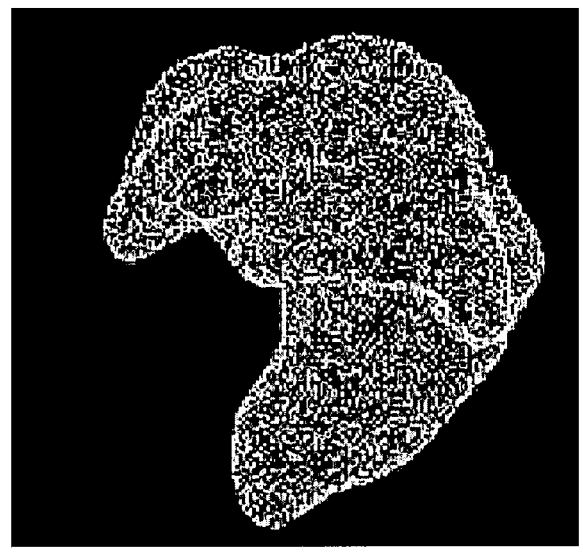
FIG. 2 is an ear impression that has been scanned according to an exemplary embodiment of the present invention.

The electronic detailing procedure of the present invention uses several functions to model binaural shells based on data related to a patient's ear impressions such as surface reconstruction, line cut, canal tapering, local relaxing, canal extension, band selection, offset, etc. In the first step of the procedure, data associated with a patient's ear impressions is loaded into the CPU 110, memory 120 or database 145 (of FIG. 1). This is accomplished by scanning the patient's ear impressions using the 3D scanner 105 (of FIG. 1) and storing the data in a format such as point cloud format (i.e., .ASC) or stereo lithography format (i.e., .STL), etc. FIG. 2 illustrates an ear impression that has been scanned in point cloud format.

Figure 3:
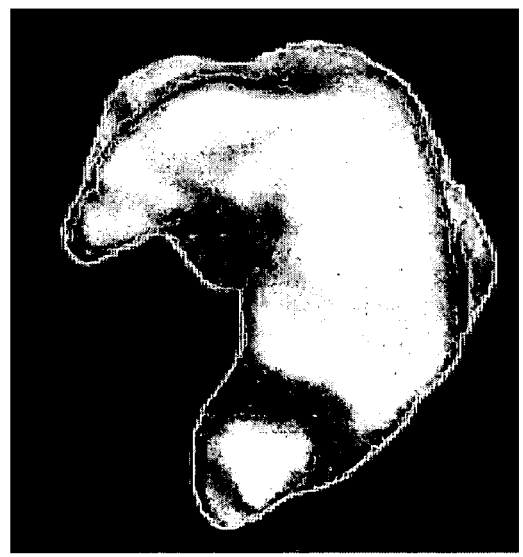
FIG. 3 illustrates a surface reconstruction according to an exemplary embodiment of the present invention.

Included in the loading procedure is a surface reconstruction of the scanned ear impression. An example surface reconstruction of the scanned ear impression is shown in FIG. 3. A surface reconstruction is typically used because data from the 3D scanner 105 may consist of certain outliers, noise and holes, which result in an incomplete or inadequate surface model of the impression. In order to reconstruct the surface, a robust data pre-processing method (e.g., rapid triangulation, 3D alpha shape, delaunay mesh generation, Quickhuall, voronori, etc.) is implemented to remove the outliers, reduce the noise and fill small holes while preserving the original geometry of the surface model (i.e., impression shell). The surface reconstruction may additionally remove a number of defects resulting from different sources such as scars, earwax, tissue, or hair in the ear.

Subsequent to the creation of the surface model, a number of modifications and/or processing steps are performed to create a final model of the hearing aid shell to be manufactured. One of the first modifications performed on the surface model of the hearing aid shell is a line cut function and/or procedure for reducing the model (i.e., impression shell) to a desired size and shape. This is accomplished by defining a cutting plane that divides the impression shell into two parts and, removing a portion of the impression that is not desired. The line cut also includes several functions such as, open line cut, close line cut and rounding. All of which may be used to modify the impression shell. Open line cut is used to cut the impression at specified positions resulting in an open model at the area of application. Close line cut is similar to the open line cut; however, it has an additional step that fills open contours at specified cutting positions resulting in a closed impression at the area of application.

Figure 4:
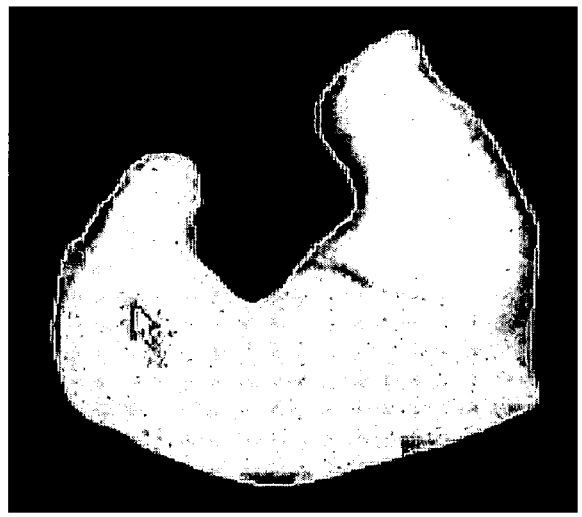
FIG. 4 illustrates a bottom line cut according to an exemplary embodiment of the present invention.
Figure 5:
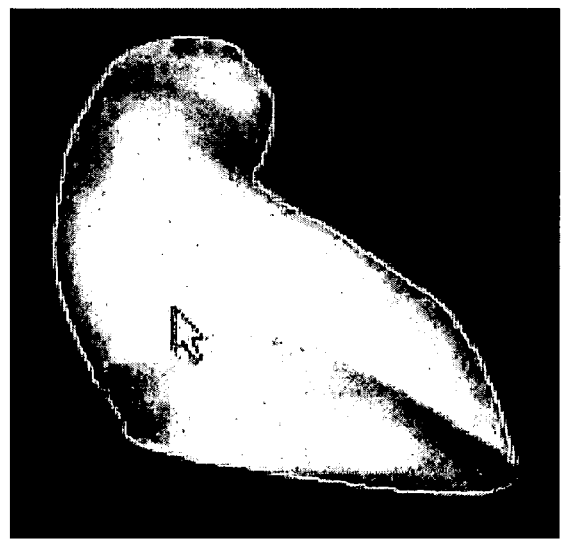
FIG. 5 illustrates a bottom line open cut according to an exemplary embodiment of the present invention.
Figure 6:
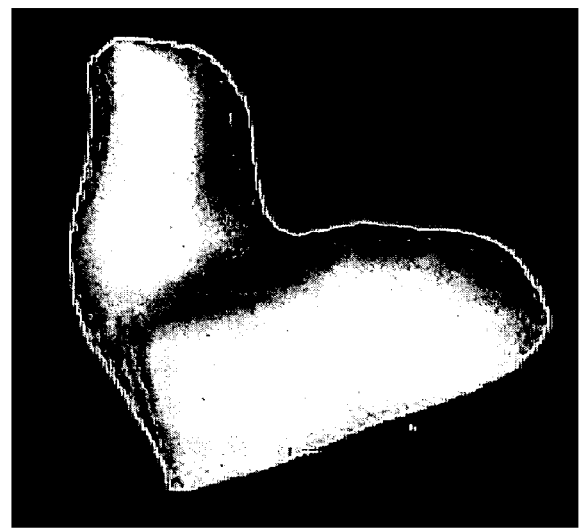
FIG. 6 illustrates a rounding according to an exemplary embodiment of the present invention.

An example of a bottom line cut with filling is shown in FIG. 4. As shown in FIG. 4, a cutting plane is defined, which intersects the impression shell at a desired position, and the area below the cutting plane is removed. Then the open intersect contour is filled. An example of a bottom line open cut is shown in FIG. 5. As shown in FIG. 5, a cutting plane is defined, which intersects the impression shell at a desired position, and the area below the cutting plane is removed. The bottom contour is left un-filled. The rounding function allows an impression cut followed by predetermined levels of rounding. In other words, this function replaces the planar surface resulting from the line close cut with a rounded interpolated surface that captures the curvature of the impression. An example of rounding is shown in FIG. 6. As shown in FIG. 6, after using the rounding function, the right area of an impression shell is removed. In addition, the cutting area is filled with a rounded interpolated surface.

Figure 7:
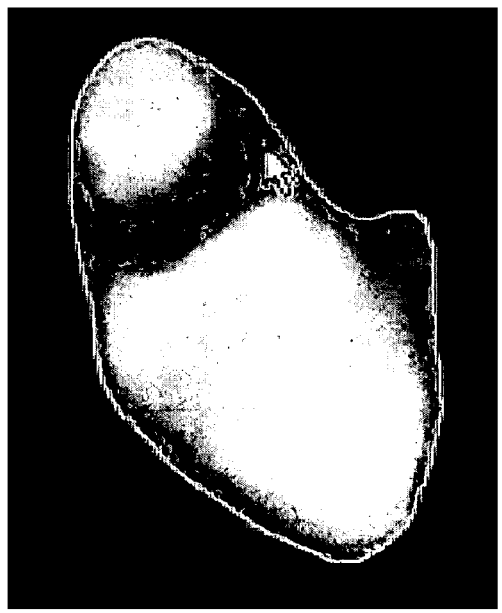
FIG. 7 illustrates a tapering according to an exemplary embodiment of the present invention.

After performing the line cut and its associated functions, the impression shell may be further modified by using tapering and extension functions. The tapering function is used to trim the canal tip (of the ear canal) if it is overly extended and taper the resulting impression. The tapering function as shown in FIG. 7 is typically used to smooth the edge of a line following a close cut operation. In contrast to tapering, extension is used to extend the canal along the topology of the canal tip when the resulting canal is too short.

Figure 8:
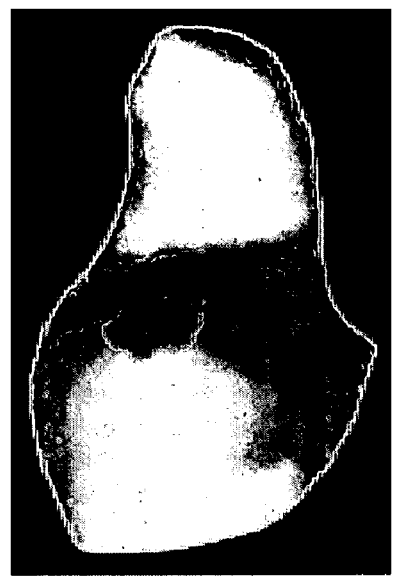
FIG. 8 illustrates a local offsetting according to an exemplary embodiment of the present invention.
Figure 9:
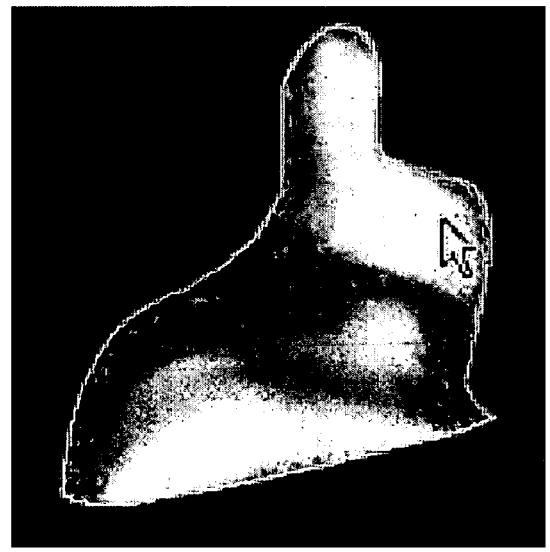
FIG. 9 illustrates an ipsilateral routing of signal (I-ROS) cutting according to an exemplary embodiment of the present invention.
Figure 10:
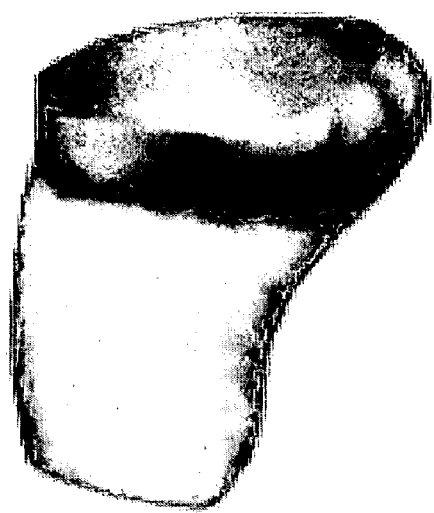
FIG. 10 illustrates a detailed hearing aid shell according to an exemplary embodiment of the present invention.

Additional modifications to the impression shell may also be performed during the electronic detailing process. These modifications are accomplished through use of the following functions, inter alia: (1) local relaxing; (2) band selection; (3) offset and (4) ipsilateral routing of signal (I-ROS) cutting. Local relaxing is used to remove additional bumps, artifacts or voids or fill up dimples or depressions in the resulting impression shell by implementing the relaxation on a selected local surface area (e.g., a region of interest) and recovering the surface. Band selection is used to provide more specific band-like shapes around the impression and is typically used in conjunction with an offset to apply changes (e.g., expansion and shrinkage) to the specified band of the impression. Offset is used to make volumetric changes such as expansion and shrinkage in the impression for fitting assessment and remarks. This function has two modes: (1) local offset and (2) global offset. In local offset only the selected portion of an impression will be changed as indicated by the shaded area in FIG. 8 whereas in global offset the entire impression may be changed. I-ROS utilizes a non-occluding design without contralateral routing and is used to create impressions for patients with mild to moderate high frequency hearing loss. As shown in FIG. 9, I-ROS cutting is performed, whereby the upper right hand corner of the ear impression is removed as indicated by the perpendicular cut. Upon completion of detailing the detailed impression (as shown in FIG. 10) is transferred to a point cloud or stereo lithographic format and stored in a CPU, database or memory for future use, particularly for electronic modeling of the hearing aid shell.

Upon completion of the electronic detailing procedure, an electronic modeling procedure is undertaken to create a physical version of the detailed impression. The electronic modeling procedure for use with the present invention performs several operations on the detailed impression such as adjusting its wall thickness, integrating a faceplate, forming a vent channel and receiver holes, labeling, collision detection, etc. to create the physical version of the detailed impression.

Figure 11:
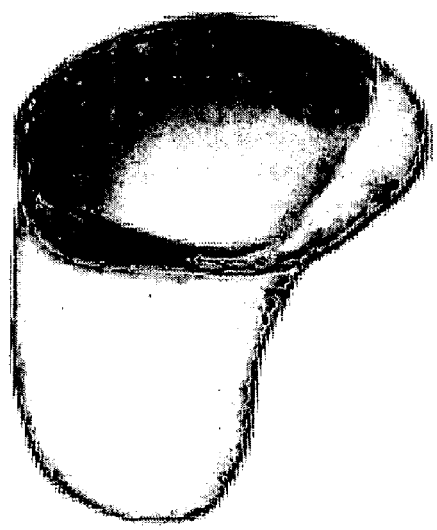
FIG. 11 illustrates an adjusted wall thickness according to an exemplary embodiment of the present invention.
Figure 12:
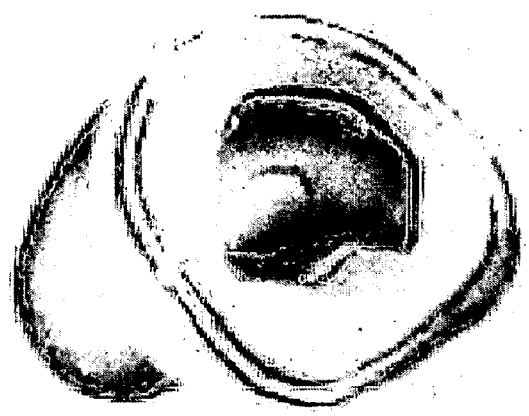
FIG. 12 illustrates a faceplate and centerline according to an exemplary embodiment of the present invention.
Figure 13:
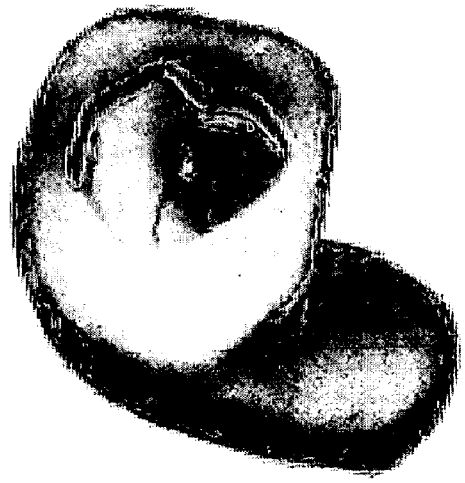
FIG. 13 illustrates an integrated faceplate according to an exemplary embodiment of the present invention.

One of the first operations undertaken on the impression shell is to optimize the impression's geometry. As shown in FIG. 11, the detailed impression's (of FIG. 10) wall thickness is modified in order to increase the strength and stability of the impression. Another operation that may be performed on the impression is to apply a face or cover plate to the impression. FIGS. 12 and 13 illustrate a faceplate and an impression with the faceplate integrated thereto. In order to integrate the faceplate to the impression an area is created for the faceplate by cutting away part of the impression. This area is carefully configured so that the faceplate will be in alignment with electronic hearing components that are or will be placed in the impression. Once the cutting is complete the faceplate is applied to the impression.

Figure 14:
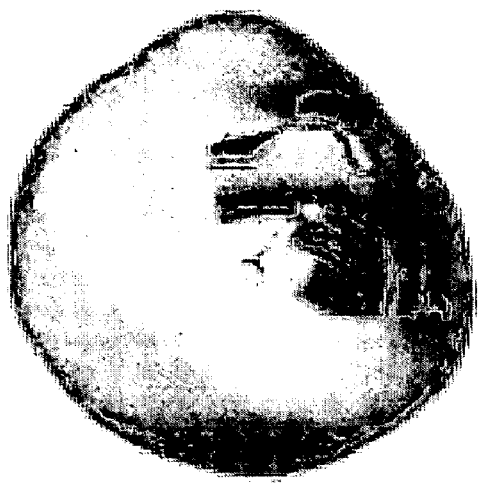
FIG. 14 illustrates a ventilation channel according to an exemplary embodiment of the present invention.
Figure 15:
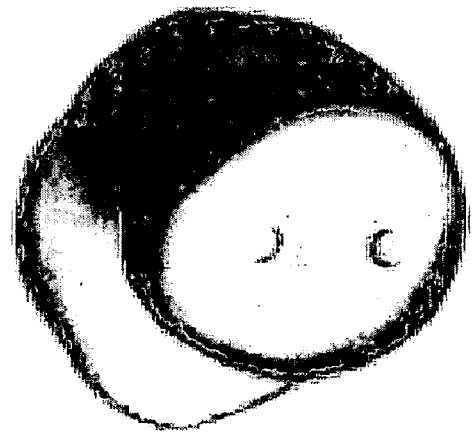
FIG. 15 illustrates a receiver hole according to an exemplary embodiment of the present invention.

In order to ensure proper performance of the physical version of the impression, a pressure compensation/ventilation channel or a sound bore are created. FIG. 14 illustrates a ventilation channel that runs for example, inside the impression. Similarly, electronic components should be easily connected. FIG. 15 illustrates a receiver hole that is used to connect a transducer tube to other components of the impression.

Figure 16:
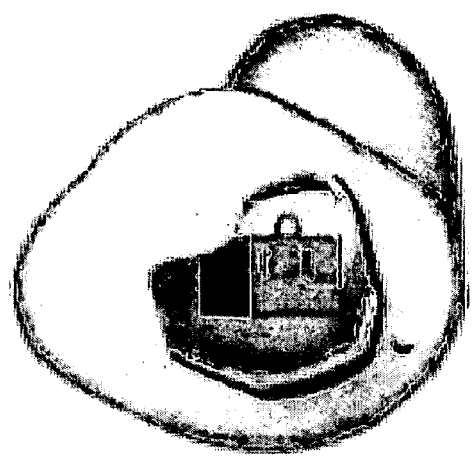
FIG. 16 illustrates collision detection according to an exemplary embodiment of the present invention.
Figure 17:
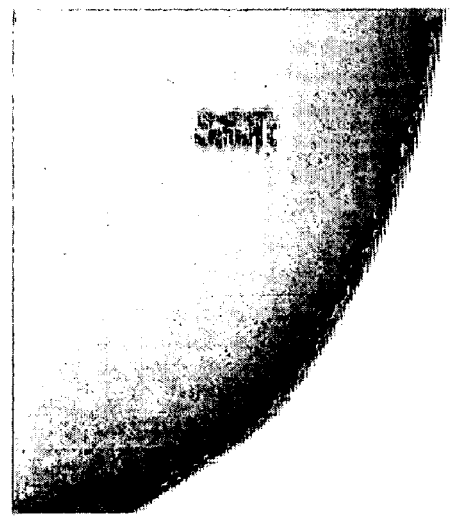
FIG. 17 illustrates labeling according to an exemplary embodiment of the present invention.

Component placement is an additional process undertaken during electronic modeling. It is typically an iterative process in which components are placed on or in the impression until an acceptable arrangement is obtained. Several design tools are used to assist in component placement such as locking and placing components in relation to the impression surface and collision detection (as shown in FIG. 16) so that components do not interfere with each other or the impression. After the modeling process is complete, a unique identifier is typically placed on the physical version of the impression. FIG. 17 illustrates the labeling of an earpiece. The label or identifier may be a serial number, barcode or color code, etc.

Figure 18:
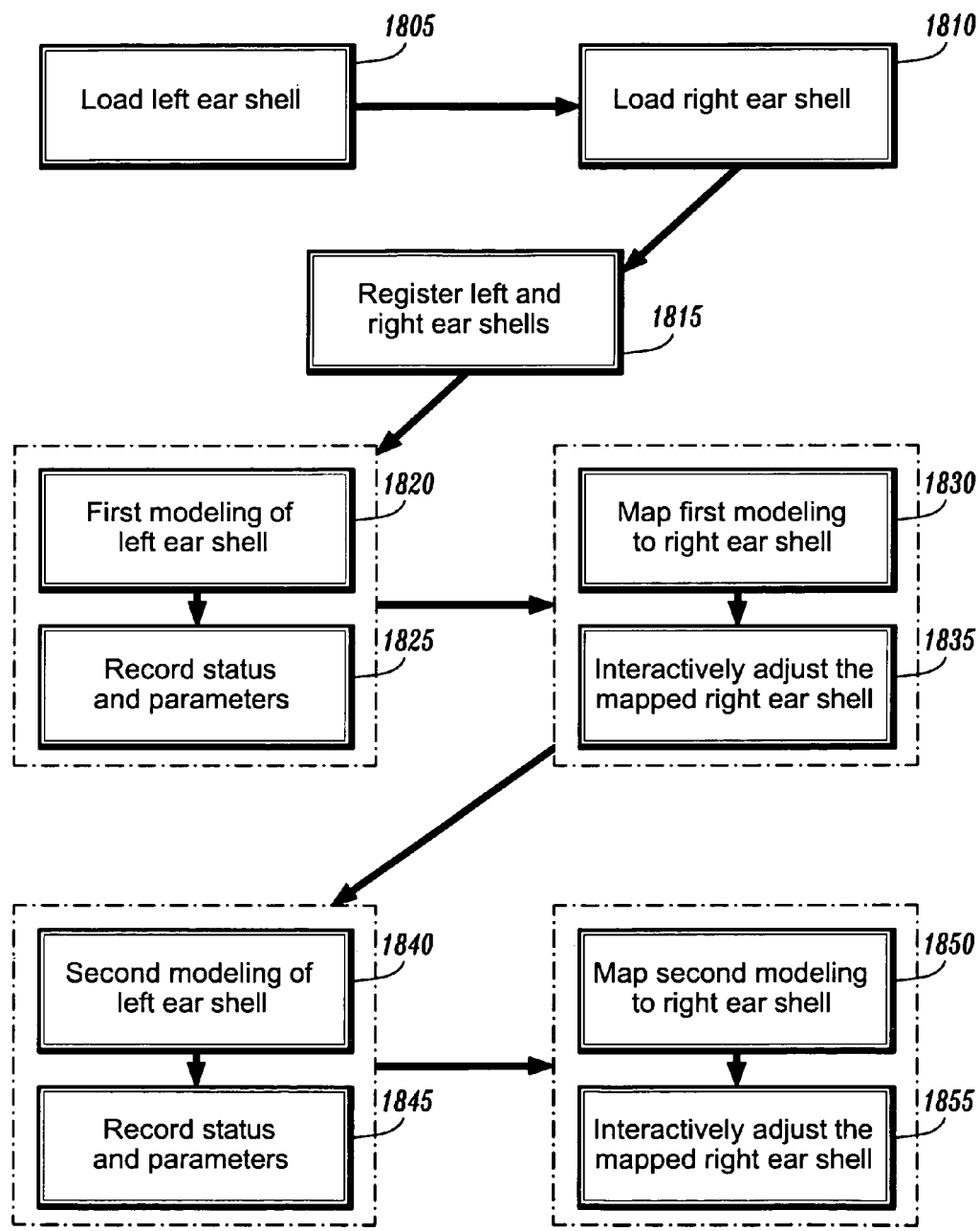
FIG. 18 is a flowchart illustrating binaural electronic modeling according to an exemplary embodiment of the present invention.

FIG. 18 is a flowchart illustrating binaural electronic modeling according to an exemplary embodiment of the present invention. As shown in FIG. 18, data from a left ear shell is loaded into the CPU 110 (step 1805). Subsequently, the data from a right ear shell is loaded into the CPU 110 (step 1810). As discussed above with reference to FIGS. 2 and 3 the data from the left and right ear shells is loaded by first acquiring a physical ear impression of a patient's ear from a medical professional and then scanning the data with the scanner 105. The scanned data is stored in a point cloud, stereo lithographic, rhino, wavefront, etc. format and is then transmitted to the CPU 110. Once the data is in the CPU 110 it is reconstructed to form a pair of 3D surface shell models. The 3D models of the shells are geometric surfaces parameterized by a set of vertices, which are connected to each other by triangles. The 3D models of the shells are viewed by an operator via an output device 140 (of FIG. 1) such as a cathode ray tube (CRT) display. It is to be understood that the process described with reference to FIG. 18, is almost fully automated and may handle most of the steps with no or very little operator interaction. The operator, however, may interact when necessary via an input device 135 (of FIG. 1) such as a keyboard or a personal digital assistant (PDA).

After the left and right ear shells are loaded into the CPU 110, they are registered using for example, a feature-based, point based, model based or global similarity registration (step 1815). During registration the parameterized set of vertices or triangles (i.e., vertex/triangle) associated with the shells is stored in a memory 120 and/or database 145 (of FIG. 1). This enables the determination of the transformation matrix between two shells and thus, the corresponding vertex/triangle in one shell and a vertex/triangle in another shell can be located. Once in the memory 120 or database 145, the data associated with the features of the left and right ear are stored in corresponding registration fields. For example, the data associated with the left ear canal and concha and the data associated with the right ear canal and concha are stored in left and right ear fields corresponding to canal and concha, respectively. It is to be understood that the registration fields are also used to store data for general ear features such as curvature, moments, principle vectors, etc. or specific ear features such as canal, canal tip, base, helix/anti-helix, concha, tragus/anti-tragus, etc.

As shown in FIG. 18, after the left and right ear shells have been registered modeling begins on the left ear shell (step 1820). It is to be understood that any number of modeling steps and/or functions may take place in step 1820 including but not limited to detailing steps such as line cut, tapering, extension, relaxing, offsetting, etc. and modeling steps such as adjusting wall thickness, integrating a faceplate, forming a vent channel and receiver holes, labeling, collision detection, etc. In addition, the detailing and modeling steps may take place in any order and the modeling in step 1820 may begin on the right ear. It is to be understood, however, that the detailing steps are to be completed before executing the modeling steps. For exemplary purposes, however, a detailing step such as a line cut takes place in step 1820. After the line cut takes place its status and parameters (e.g., the parameters associated with the location of the cutting plane where the line cut took place) are recorded and stored in a memory such as a RAM 125 (of FIG. 1) (step 1825).

As further shown in FIG. 18, the data stored in step 1825 is then mapped to the right ear shell (step 1830). This is accomplished by recording the position of the operation (e.g., recording the operation name and parameters) in step 1820 and using the registration data (e.g., the transformation matrix) to determine the corresponding position on the right ear shell where the operation will take place. The recorded operation will then be performed on the right ear shell. In other words, the data associated with the line cut that was applied to the left ear shell in step 1820 is now applied to the right ear shell so that the same line cut takes place on the right ear shell. After step 1830, an operator interactively adjusts the resulting mapped right ear shell via an input 135 (of FIG. 1) (step 1835). Thus, for example, the operator manually adjusts the cutting plane resulting from the mapped line cut in an up and/or down position to compensate for any error introduced during the mapping step 1830.

Subsequently, an additional detailing step takes place (step 1840). As discussed above with reference to step 1820 any number of detailing and/or modeling procedures may take place in step 1840 and in any order. For this discussion, however, another detailing step such as a tapering, takes place on the left ear shell in step 1840. After the tapering takes place the status and parameters of the tapering are stored (step 1845) and then mapped to the right ear shell (step 1850). Both of these steps are similar to or the same as steps 1825 and 1830 but with different data being involved. Following the mapping step 1850, an operator interactively adjusts the resulting ear shell (step 1855) and the finalized shells are stored in a database, output to the operator for review, or the steps 1820–1855 are repeated to include any number of additional detailing modifications necessary to result in a satisfactory ear shell.

Figure 19:
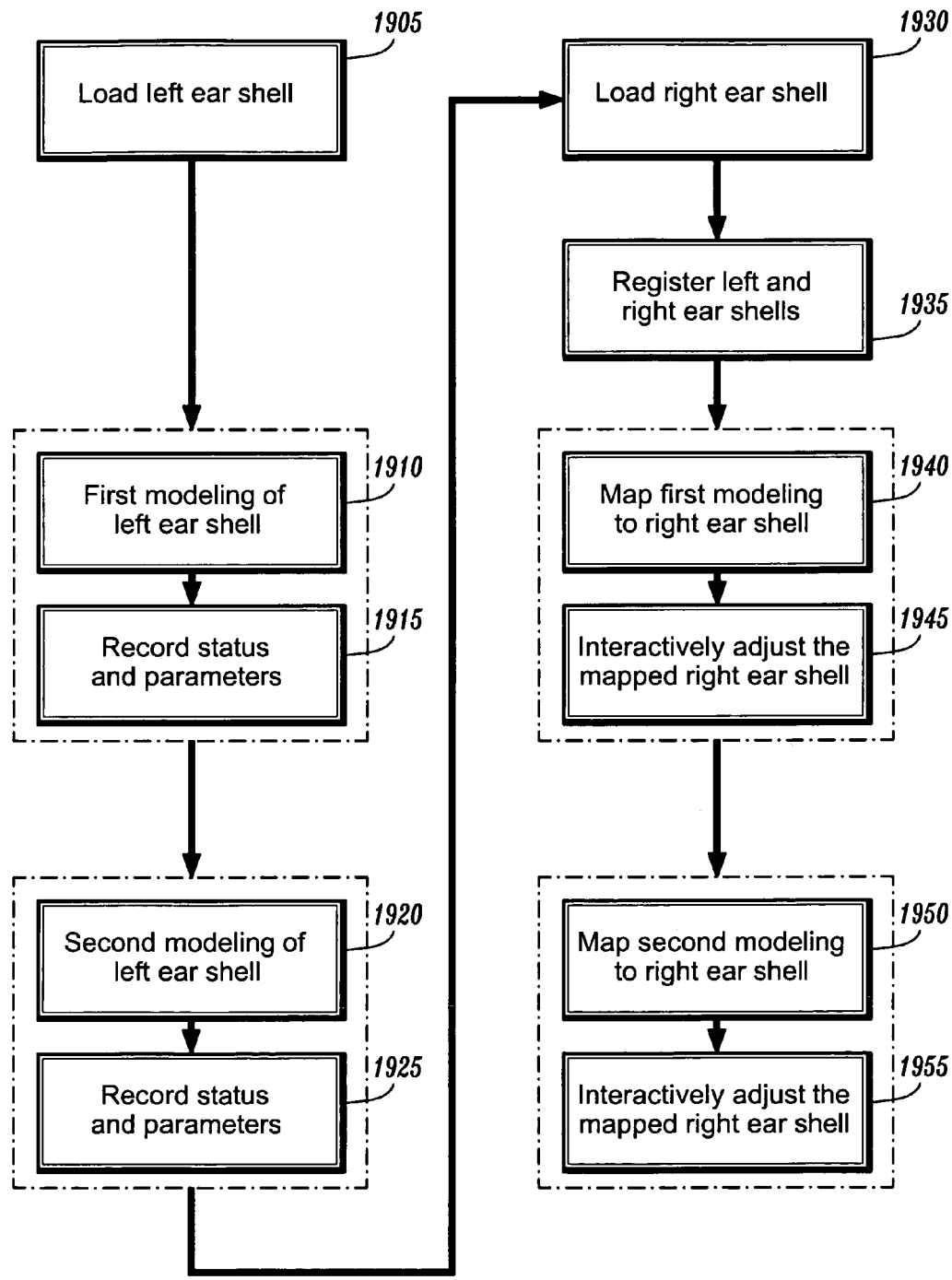
FIG. 19 is a flowchart illustrating binaural electronic modeling according to another exemplary embodiment of the present invention.

FIG. 19 is a flowchart illustrating binaural electronic modeling according to another exemplary embodiment of the present invention. For purposes of discussion a modeling process is described rather than a detailing process, however, the following steps are applicable to detailing as well. As shown in FIG. 19, data from a left ear shell is loaded into the CPU 110 (step 1905) and then modeled (e.g., the left shell's wall thickness is modified) in step 1910. After the modeling is complete the data associated with the process is stored in the RAM 125 (step 1915) and another modeling takes place (e.g., inserting a label onto the shell) (step 1920). Subsequently, the data from step 1920's modeling is stored in the RAM 125 (step 1925) and the left ear shell model is completed.

As shown in FIG. 19, after modeling the left ear shell, the data associated with the right ear shell is loaded into the CPU 110 (step 1930). The left and right ear shells are then registered (step 1935) and the modeling from step 1910 is mapped to the right ear shell (step 1940). An operator then manually adjusts the resulting right ear shell (step 1945). After step 1945, the modeling from step 1920 is mapped to the right ear shell (1950) and if necessary an operator manually adjusts the resulting right ear shell (step 1955) and the ear shell models are output via an output device 140 or stored in the memory 120 or a database 150 (of FIG. 1).

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

It is to be further understood that, because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It should also be understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be straightforwardly implemented without departing from the spirit and scope of the present invention. It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for modeling binaural shells for hearing aids, comprising:
    loading data associated with a first and a second ear shell; wherein the first ear shell corresponds to one ear and the second ear shell corresponds to the opposite ear;
    registering the data associated with the first and the second ear shells;
    processing the first ear shell;
    storing data associated with the processing of the first ear shell;
    mapping the data associated with the processing of the first ear shell to the second ear shell; and
    adjusting the mapped second ear shell.

2. The method of claim 1, wherein the loading step further comprises:
    obtaining a three-dimensional (3D) model of an ear shell; and
    reconstructing the 3D model.

3. The method of claim 2, wherein the 3D model is obtained by scanning an auditory canal, concha, or meatus of an ear.

4. The method of claim 1, wherein the registering further comprises:
    determining a similar feature between the first and the second ear shells;
    calculating a transformation matrix for the first and the second ear shells; and
    determining a difference between the first and the second ear shells.

5. The method of claim 1, wherein the first ear shell is modified in the processing step according to a detailing procedure.

6. The method of claim 5, wherein the detailing procedure is one of a line cut, tapering, extension, relaxing, band selection, offset, ipsilateral routing of signal (I-ROS) cutting, etc.

7. The method of claim 1, wherein the first ear shell is modified in the processing step according to a modeling procedure.

8. The method of claim 7, wherein the modeling procedure is one of a geometric adjustment, faceplate integration, vent channel formation, receiver hole formation, labeling, collision detection, etc.

9. The method of claim 1, wherein the mapping further comprises:
    receiving the stored processing data associated with the first ear shell; and
    applying a transformation matrix associated with the registered data of the first and the second ear shells so that the processing that occurred on the first ear shell is performed on the second ear shell.

10. The method of claim 1, wherein the mapped second ear shell is interactively adjusted by an operator to compensate for an inconsistency in the mapped second ear shell.

11. The method of claim 10, wherein the operator interactively adjusts the mapped second ear shell via an input such as a keyboard, mouse, personal digital assistant (PDA), etc.

12. The method of claim 10, wherein data associated with the mapped second ear shell is stored in a database and/or memory.

13. The method of claim 1, wherein the data associated with the processing of the first ear shell is stored in a database and/or memory.

14. The method of claim 1, further comprising:
    outputting the first and the second ear shells.

15. A system for modeling binaural shells for hearing aids, comprising:
    a memory device for storing a program;
    a processor in communication with the memory device, the processor operative with the program to:
    load data associated with a first and a second ear shell; wherein the first ear shell corresponds to one ear and the second ear shell corresponds to the opposite ear;
    register the data associated with the first and the second ear shells;
    process the first ear shell;
    store data associated with the processing of the first ear shell;
    map the data associated with the processing of the first ear shell to the second ear shell; and
    adjust the mapped second ear shell.

16. The system of claim 15, wherein the processor is further operative with the program, when loading, to:
    obtain a three-dimensional (3D) model of an ear shell; and
    reconstruct the 3D model.

17. The system of claim 16, wherein the 3D model is obtained by scanning an auditory canal, concha, or meatus of an ear.

18. The system of claim 15, wherein the processor is further operative with the program, when registering, to:
    determine a similar feature between the first and the second ear shells;
    calculate a transformation matrix for the first and the second ear shells; and
    determine a difference between the first and the second ear shells.

19. The system of claim 15, wherein the first ear shell is modified when processing according to a detailing procedure.

20. The system of claim 19, wherein the detailing procedure is one of a line cut, tapering, extension, relaxing, band selection, offset, ipsilateral routing of signal (I-ROS) cutting, etc.

21. The system of claim 15, wherein the first ear shell is modified when processing according to a modeling procedure.

22. The method of claim 21, wherein the modeling procedure is one of a geometric adjustment, faceplate integration, vent channel formation, receiver hole formation, labeling, collision detection, etc.

23. The system of claim 15, wherein the processor is further operative with the program, when mapping, to:
    receive the stored processing data associated with the first ear shell; and
    apply a transformation matrix associated with the registered data of the first and the second ear shells so that the processing that occurred on the first ear shell is performed on the second ear shell.

24. The system of claim 15, wherein the mapped second ear shell is interactively adjusted by an operator to compensate for an inconsistency in the mapped second ear shell.

25. The system of claim 24, wherein the operator interactively adjusts the mapped second ear shell via an input such as a keyboard, mouse, personal digital assistant (PDA), etc.

26. The system of claim 24, wherein data associated with the mapped second ear shell is stored in a database and/or memory.

27. The method of claim 15, wherein the data associated with the processing of the first ear shell is stored in a database and/or memory.

28. The system of claim 15, wherein the processor is further operative with the program to:
   output the first and the second ear shells.

29. A computer program product comprising a computer useable medium having computer program logic recorded thereon for modeling binaural shells for hearing aids, the computer program logic comprising:
   program code for loading data associated with a first and a second ear shell; wherein the first ear shell corresponds to one ear and the second ear shell corresponds to the opposite ear;
   program code for registering the data associated with the first and the second ear shells;
   program code for processing the first ear shell;
   program code for storing data associated with the processing of the first ear shell;
   program code for mapping the data associated with the processing of the first ear shell to the second ear shell; and
   program code for adjusting the mapped second ear shell.

30. A system for modeling binaural shells for hearing aids, comprising:
   a means for loading data associated with a first and a second ear shell; wherein the first ear shell corresponds to one ear and the second ear shell corresponds to the opposite ear;
   a means for registering the data associated with the first and the second ear shells;
   a means for processing the first ear shell;
   a means for storing data associated with the processing of the first ear shell;
   a means for mapping the data associated with the processing of the first ear shell to the second ear shell; and
   a means for adjusting the mapped second ear shell.

31. A method for modeling binaural shells for hearing aids, comprising:
   loading data associated with a first ear shell;
   processing the first ear shell;
   storing data associated with the processing of the first ear shell;
   loading data associated with a second ear shell; wherein the first ear shell corresponds to one ear and the second ear shell corresponds to the opposite ear;
   registering the first and the second ear shells;
   mapping the data associated with the processing of the first ear shell to the second ear shell; and
   interactively adjusting the mapped second ear shell.

32. A method for modeling binaural shells for hearing aids, comprising:
   loading data associated with a first and a second ear shell that has been obtained by scanning an auditory canal, concha, or meatus of an ear; wherein the first ear shell corresponds to one ear and the second ear shell corresponds to the opposite ear;
   registering the data associated with the first and the second ear shells to represent the surface of the loaded data as a three-dimensional model;
   processing the first ear shell by performing a detailing and/or modeling procedure on the first ear shell;
   storing data associated with the processing of the first ear shell in a database and/or memory;
   mapping the data associated with the processing of the first ear shell to the second ear shell so that the processing that occurred on the first ear shell is performed on the second ear shell; and
   interactively adjusting the mapped second ear shell via an input means to compensate for an inconsistency in the mapped second ear shell.

* * * * *